US010239509B2

(12) United States Patent
Mayer et al.

(10) Patent No.: US 10,239,509 B2
(45) Date of Patent: Mar. 26, 2019

(54) PRIMARY PISTON ASSEMBLY FOR A MASTER BRAKE CYLINDER OF A BRAKING SYSTEM OF A VEHICLE, MANUFACTURING METHOD FOR A BRAKING UNIT, AND METHOD FOR OPERATING A BRAKING UNIT

(75) Inventors: Jochen Mayer, Giengen An der Brenz (DE); Frank Overzier, Boeblingen (DE)

(73) Assignee: ROBERT BOSCH GmbH, Stuttgart (DE)

( * ) Notice: Subject to any disclaimer, the term of this patent is extended or adjusted under 35 U.S.C. 154(b) by 738 days.

(21) Appl. No.: 14/348,807

(22) PCT Filed: Aug. 7, 2012

(86) PCT No.: PCT/EP2012/065419
§ 371 (c)(1),
(2), (4) Date: Jul. 28, 2014

(87) PCT Pub. No.: WO2013/045156
PCT Pub. Date: Apr. 4, 2013

(65) Prior Publication Data
US 2014/0325973 A1    Nov. 6, 2014

(30) Foreign Application Priority Data

Sep. 30, 2011  (DE) .......................... 10 2011 083 827

(51) Int. Cl.
*B60T 11/20*        (2006.01)
*B60T 13/74*        (2006.01)
(Continued)

(52) U.S. Cl.
CPC ................. *B60T 11/20* (2013.01); *B60T 8/40* (2013.01); *B60T 8/44* (2013.01); *B60T 11/10* (2013.01);
(Continued)

(58) Field of Classification Search
CPC .... B60T 8/3265; B60T 13/745; B60T 8/3275; B60T 8/441; B60T 8/042; B60T 13/142;
(Continued)

(56) References Cited

U.S. PATENT DOCUMENTS 2,518,821 A * 8/1950 Roy ...................... B60T 11/224
60/578
4,172,364 A * 10/1979 Young ................... B60T 13/565
60/550
(Continued)

FOREIGN PATENT DOCUMENTS

CN      1359819 A     7/2002
DE      103 46 117    1/2005
(Continued)

OTHER PUBLICATIONS

International Search Report, PCT International Application No. PCT/EP2012/065419, dated May 10, 2013.

*Primary Examiner* — Michael Leslie
*Assistant Examiner* — Michael Quandt
(74) *Attorney, Agent, or Firm* — Norton Rose Fulbright US LLP; Gerard Messina (57) ABSTRACT

A primary piston assembly for a master brake cylinder of a braking system of a vehicle, including a first primary piston component having a first piston element to which a driver braking force is transmittable in such a way that a pressure chamber volume of a pressure chamber of a master brake cylinder of the braking system which is fillable with liquid is reducible by moving the first piston element with the aid of the driver braking force, and a second primary piston component having a second piston element to which the first braking assisting force is transmittable in such a way that the
(Continued)

pressure chamber volume of the pressure chamber is reducible by moving the second piston element with the aid of the first braking assisting force.

18 Claims, 9 Drawing Sheets

(51) Int. Cl.
*B60T 13/14* (2006.01)
*B60T 13/16* (2006.01)
*B60T 8/40* (2006.01)
*B60T 8/44* (2006.01)
*B60T 11/10* (2006.01)
*B60T 11/18* (2006.01)
*B60T 13/12* (2006.01)
*B62D 65/00* (2006.01)

(52) U.S. Cl.
CPC ............... *B60T 11/18* (2013.01); *B60T 13/12* (2013.01); *B60T 13/142* (2013.01); *B60T 13/162* (2013.01); *B60T 13/745* (2013.01); *B62D 65/00* (2013.01); *Y10T 29/49826* (2015.01)

(58) Field of Classification Search
CPC .... B60T 13/161; B60T 13/146; B60T 13/746; B60T 11/18; B60T 11/20; B60T 11/224
See application file for complete search history.

(56) References Cited

U.S. PATENT DOCUMENTS

| | | | |
|---|---|---|---|
| 6,634,724 B2 * | 10/2003 | Kobayashi | B60T 8/3265 188/1.11 E |
| 8,061,786 B2 | 11/2011 | Drumm et al. | |
| 8,096,122 B2 | 1/2012 | Ikeda et al. | |
| 2008/0295512 A1 * | 12/2008 | Obata | B60T 13/745 60/545 |
| 2009/0026835 A1 * | 1/2009 | Matsubara | B60T 7/12 303/15 |
| 2011/0048874 A1 | 3/2011 | Vollert et al. | |
| 2011/0297493 A1 | 12/2011 | Vollert et al. | |
| 2012/0192556 A1 * | 8/2012 | Verhagen | B60T 8/38 60/585 |
| 2012/0265417 A1 | 10/2012 | Vollert et al. | |
| 2013/0047593 A1 | 2/2013 | Weiberle et al. | |

FOREIGN PATENT DOCUMENTS

| | | |
|---|---|---|
| DE | 10 2005 017 958 | 4/2006 |
| DE | 10 2008 064 394 | 7/2009 |
| DE | 10 2008 001 061 | 10/2009 |
| DE | 10 2008 001 522 | 11/2009 |
| DE | 10 2009 047 263 | 6/2010 |
| DE | 10 2009 028 034 | 2/2011 |
| DE | 10 2009 045 415 | 4/2011 |
| EP | 2 189 345 | 5/2010 |
| JP | 2008296782 A | 12/2008 |
| WO | 2011026710 A1 | 3/2011 |
| WO | WO 2011/098178 | 8/2011 |

\* cited by examiner

PRIMARY PISTON ASSEMBLY FOR A MASTER BRAKE CYLINDER OF A BRAKING SYSTEM OF A VEHICLE, MANUFACTURING METHOD FOR A BRAKING UNIT, AND METHOD FOR OPERATING A BRAKING UNIT

FIELD

The present invention relates to a primary piston assembly for a master brake cylinder of a braking system of a vehicle. Moreover, the present invention relates to a manufacturing method for a braking unit having at least one master brake cylinder and one brake booster. Furthermore, the present invention relates to a method for operating a braking unit.

BACKGROUND INFORMATION

A hydraulic master brake cylinder is described in German Patent Application No. DE 10 2009 028 034 A1. The hydraulic master brake cylinder includes a primary piston component having a piston element, the primary piston component being movable with the aid of a driver braking force in such a way that a pressure chamber volume of a pressure chamber of the hydraulic master brake cylinder which is fillable with liquid is reducible. Furthermore, with the aid of a brake booster, a braking assisting force should also be exertable on the first primary piston component in such a way that the pressure chamber volume of the pressure chamber which is fillable with liquid is additionally reducible, also with the aid of the braking assisting force.

SUMMARY

The present invention provides an example primary piston assembly for a master brake cylinder of a braking system of a vehicle, an example braking unit for a vehicle, an example braking system for a vehicle, an example manufacturing method for a braking unit which includes at least one master brake cylinder and one brake booster, an example manufacturing method for a braking system of a vehicle, and an example method for operating a braking unit.

The first primary piston component and/or the second primary piston component may each be a primary piston/rod piston. However, it is pointed out that the first primary piston component and the second primary piston component are not limited to a design as a primary piston or rod piston. In particular, the design of the first primary piston component and the second primary piston component is not limited to a specific type of primary piston or rod piston.

The first primary piston component and/or the second primary piston component may have a one-piece/one-part design. Likewise, the first primary piston component and/or the second primary piston component may also be composed of multiple combined subunits. It is pointed out that the use of the term "element" also does not limit the design of the first piston element and/or of the second piston element to a one-piece design. Likewise, the first piston element and/or the second piston element may have a one-piece/one-part design with at least one additional component of the associated primary piston component.

The present invention achieves a separation/subdivision of a primary piston/rod piston, which is movable into a pressure chamber of a master brake cylinder, into various segments/pistons/bolt components. A desired (overall) braking surface may be varied with the aid of the achieved separation. As described in greater detail below, in particular with the aid of the achieved separation, the braking force to be applied by a driver in the event of a failure of the brake booster actuator device in order to build up brake pressure in the particular pressure chamber of the master brake cylinder is reducible. This makes it easier for a driver to brake the master brake cylinder, specifically when there is a failure of the brake booster actuator device.

A transmission of the driver braking force to the second primary piston component is preferably suppressed/prevented. It may thus be ensured that in braking the pressure chambers of the master brake cylinder after a failure of the brake booster actuator device, the driver only has to counteract the pressure acting on the first primary piston component/the first piston element. The above-described reduction of the braking force to be applied by the driver in the event of a failure of the brake booster actuator device may thus be reliably ensured.

In one preferred specific embodiment, the first piston element has a continuous recess within which the second piston element is situated so as to be at least partially movable. For example, the first piston element may have a ring-shaped design. This ensures advantageous independence of the movability of the two piston elements which is unaffected by the location/position of the respective other piston element. In particular, it is thus possible to selectively vary the brake pressure that is present in the pressure chamber volume by moving only the first piston element, only the second piston element, or the two piston elements together.

At least one balancing bore of the master brake cylinder may preferably be sealed off by moving the first piston element with the aid of the driver braking force. This is easily achievable due to the external design of the first piston element. Thus, even in the event of a failure of the brake booster actuator device, with the aid of the driver braking force the at least one balancing bore, which connects the variable pressure chamber volume to a brake fluid reservoir, may still be easily sealed off, and the brake pressure in the variable pressure chamber volume may be reliably increased by moving the first piston element. Thus, reliable braking in the pressure chamber may still be easily carried out despite failure of the brake booster actuator device.

A first end section of the first primary piston component facing away from the first piston element may preferably protrude into an interior space that is spanned by at least one second end section of the second primary piston component facing away from the second piston element. Thus, despite the arrangement of the second piston element in the continuous recess in the first piston element, it is still possible to establish the first force transmission contact between at least one first force transmission element, for example an input rod and/or an at least partially elastic force transmission component, such as a reaction disk in particular, it being possible at the same time for the second force transmission contact to be present between the second piston element and at least one second force transmission element, such as a booster member, which at least partially spatially encloses the at least one first force transmission element. As described in greater detail below, it is thus possible to also use components/elements of a conventional brake booster together with the primary piston assembly according to the present invention.

A second braking assisting force may be transmittable to the first primary piston component via a third force transmission contact between the first primary piston component and at least the brake booster actuator device in such a way that the pressure chamber volume which is fillable with liquid is reducible by moving the first piston element with the aid of the second braking assisting force. Thus, with the aid of the brake booster actuator device the driver may be additionally assisted with regard to force in moving the first primary piston component/the first piston element.

The above-described advantages may also be ensured in a braking unit for a braking system of a vehicle having this type of primary piston assembly and a master brake cylinder and/or a brake booster.

In one advantageous refinement, the braking unit includes an at least partially elastic force transmission component to which the driver braking force which is exerted on a brake actuating element situated in the braking system is transmittable via at least one input rod, the first primary piston component contacting the at least partially elastic force transmission component in such a way that the first force transmission contact is present and the driver braking force is transmittable to the first primary piston component. Likewise, the braking unit may include a booster member which is movable with the aid of the brake booster actuator device, the second primary piston component contacting the booster member in such a way that the second force transmission contact is present and the first braking assisting force is transmittable to the second primary piston component. At least the first force transmission contact and the second force transmission contact are reliably achievable with the aid of such a design of the braking unit.

Furthermore, the booster member may contact the at least partially elastic force transmission component in such a way that the third force transmission contact is present and the second braking assisting force is transmittable to the first brake piston component. This ensures advantageous assistance of the driver in moving the first primary piston component with the aid of the brake booster actuator device.

Alternatively or additionally, the booster member may have a continuous opening, the input rod and/or the at least partially elastic force transmission component being at least partially guided within the continuous opening. A booster member, an input rod, and/or an at least partially elastic force transmission component of a conventional brake booster, for example a reaction disk, may thus also be used for the braking unit. Thus, inexpensive components which are already produced in large numbers may be resorted to when equipping/manufacturing the braking unit.

The above-described advantages may also be achievable with the aid of a braking system for a vehicle having at least one brake circuit and a corresponding primary piston assembly and/or a corresponding braking unit.

The above-described advantages may also be easily achievable for a braking unit having at least one master brake cylinder and one brake booster, or for a braking system of a vehicle, with the aid of the corresponding manufacturing methods.

In addition, the advantages may also be achieved by carrying out the corresponding method for operating a braking unit.

BRIEF DESCRIPTION OF THE DRAWINGS

Further features and advantages of the present invention are explained below with reference to the figures.

DETAILED DESCRIPTION OF EXAMPLE EMBODIMENTS

Figure 1A:
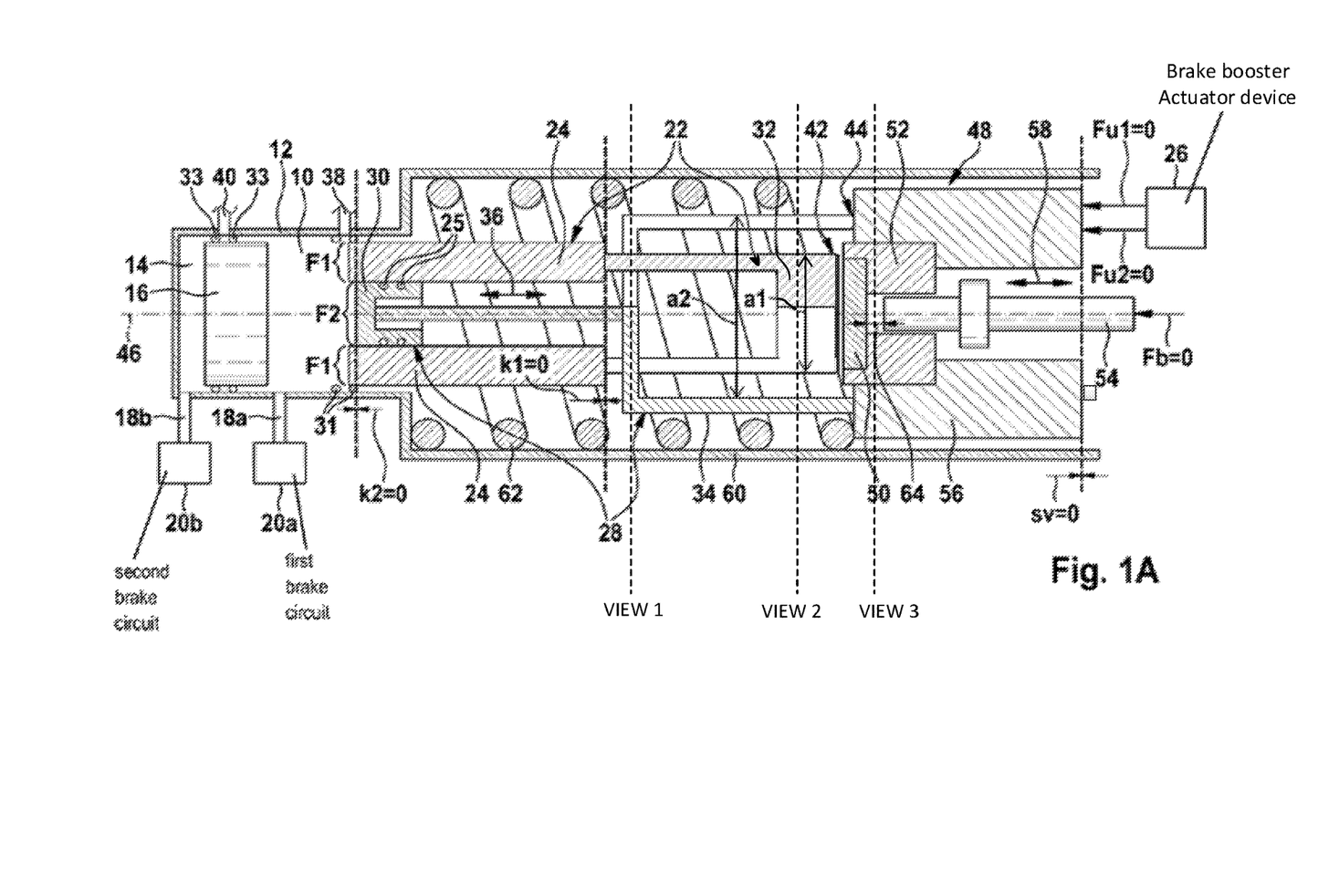
FIGS. 1A through 1C show three schematic illustrations of a first specific embodiment of the primary piston assembly.
Figure 1B:
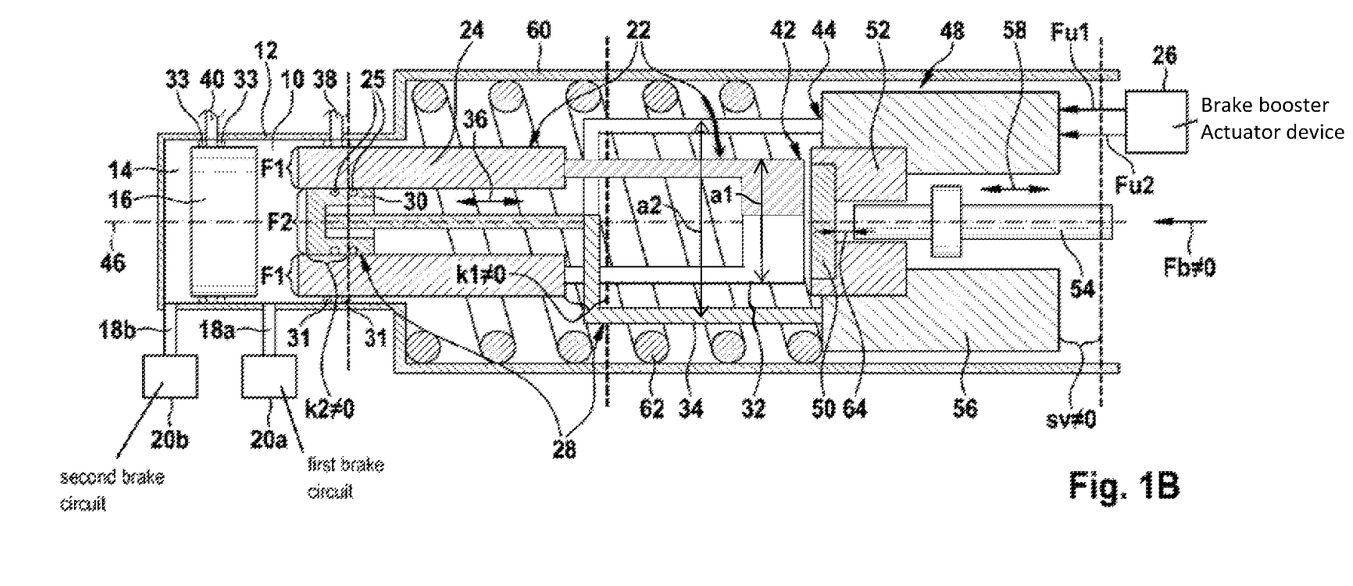
Figure 1C:
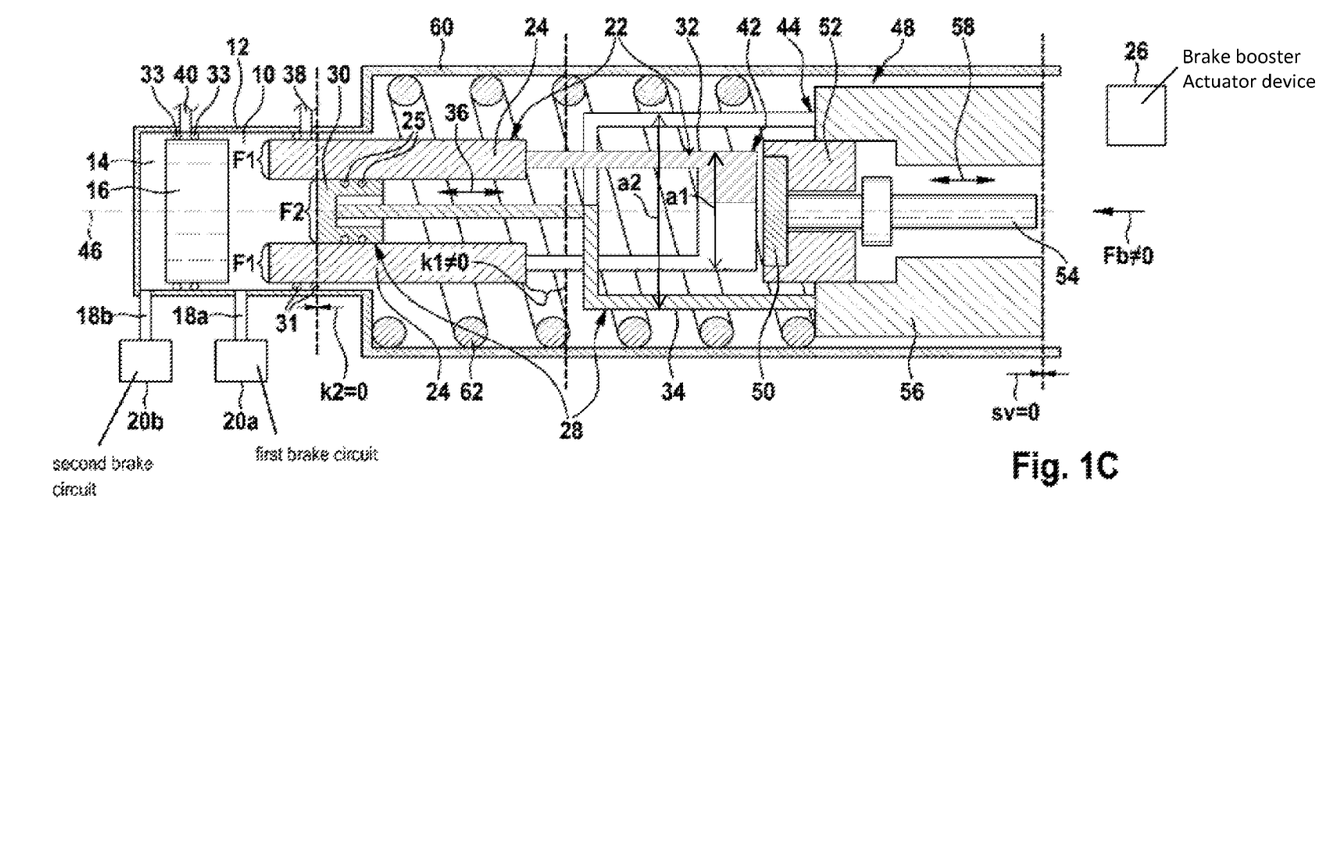

FIGS. 1A through 1C show three schematic illustrations of a first specific embodiment of the primary piston assembly.

The primary piston assembly schematically depicted in FIGS. 1A through 1C is usable in a braking unit or in a (hydraulic) braking system of a vehicle. The primary piston assembly may be used to vary at least one first brake pressure in a first pressure chamber 10 of a master brake cylinder 12. Master brake cylinder 12 may optionally also include a second pressure chamber 14. In this case, the second brake pressure present in second pressure chamber 14 is preferably variable with the aid of a floating piston 16 movably situated between first pressure chamber 10 and second pressure chamber 14. The braking system equipped with the primary piston assembly may thus include a first brake circuit 20a which is connected to first pressure chamber 10 via a first supply line 18a, and a second brake circuit 20b which is connected to second pressure chamber 14 via a second supply line 18b. However, the illustration of the braking system as a dual-circuit braking system schematically depicted in FIGS. 1A through 1C is to be interpreted strictly as an example. In addition, the usability of the primary piston assembly is not limited to a specific design of the at least one brake circuit 20a and 20b of the braking system thus equipped. Likewise, instead of a tandem master brake cylinder, some other type of master brake cylinder may be used for master brake cylinder 12.

The primary piston assembly includes a first primary pressure component 22 having a first piston element 24. A driver braking force Fb is transmittable to first primary piston component 22 via a first force transmission contact between first primary pressure component 22 and at least one brake actuating element (not illustrated) situated in the braking system. This may be carried out in such a way that a pressure chamber volume of first pressure chamber 10 of master brake cylinder 12 which is fillable with liquid is reducible by moving first piston element 24 with the aid of driver braking force Fb. The first brake pressure present in first pressure chamber 10 or in the pressure chamber volume of first pressure chamber 10 may thus be increased by moving primary piston component 22.

In addition, the pressure chamber volume of first pressure chamber 10 which is fillable with liquid is also reducible with the aid of a first braking assisting force Fu1 provided with the aid of a brake booster actuator device 26. This is achievable via a second primary piston component 28 having a second piston element 30. First braking assisting force Fu1 is transmittable to second primary piston component 28 via a second force transmission contact between second primary piston component 28 and at least brake booster actuator device 26 in such a way that the pressure chamber volume of first pressure chamber 10 which is fillable with liquid is reducible by moving second piston element 30 with the aid of first braking assisting force Fu1.

Brake booster actuator device 26 may be an electromechanical device or a hydraulic device, for example. However, the design of brake booster actuator device 26 is not limited to these mentioned examples.

The primary piston assembly composed of first primary piston component 22 and second primary piston component 28 achieves a separation/subdivision of a primary piston/rod piston which is at least partially movable into first pressure chamber 10 for increasing the first brake pressure therein. Due to the achieved separation/subdivision, an overall braking surface along which braking is carried out in the first brake chamber may be selectively set solely to a first braking surface F1 of first piston element 24 which delimits the pressure chamber volume, solely to a second braking surface F2 of second piston element 30 which delimits the pressure chamber volume, or to a sum of first braking surface F1 and second braking surface F2. A braking surface F1 and F2 may be understood to mean a surface of piston element 24 and 30, respectively, which delimits the pressure chamber volume of first pressure chamber 10, and which is displaceable for reducing the pressure chamber volume. Since the counterforce which acts in the opposite direction from braking results from the first brake pressure that is present in first pressure chamber 10 and braking surface F1 or F2, the counterforce may also be easily varied with the aid of the separation/subdivision.

There is preferably no force transmission contact between the brake actuating element (not illustrated) and second primary piston component 28. In other words, (even) a partial transmission of driver braking force Fb to second primary piston component 28/second piston element 30 is suppressed/prevented. Thus, when brake booster actuator device 26 is in a functionally impaired state, the driver only has to move first primary piston component 22 with the aid of driver braking force Fb. Thus, after a failure of brake booster actuator device 26, the driver brakes only first pressure chamber 10 at first braking surface F1. This results in a significant reduction of driver braking force Fb to be applied by the driver for building up a first brake pressure in first pressure chamber 10.

Optionally, a second braking assisting force Fu2 may be transmittable to first primary piston component 22 via a third force transmission contact between first primary piston component 22 and at least brake booster actuator device 26 in such a way that the pressure chamber volume of first pressure chamber 10 which is fillable with liquid is reducible by moving first piston element 24 with the aid of second braking assisting force Fu2.

Thus, with the aid of brake booster actuator device 26, the driver may also be assisted with regard to force in moving first primary piston component 24.

In the illustrated specific embodiment, first primary piston component 22 is composed of first piston element 24 and a separately produced first force coupling 32. Likewise, second primary piston component 28 includes second piston element 30 and a separately produced second force coupling 34. However, first primary piston component 22 and/or second primary piston component 28 may also have a one-piece/one-part design. In one alternative specific embodiment, first force coupling 32 and/or second force coupling 34 may also be composed of at least three separately produced subunits.

First primary piston component 22 is preferably movable without second primary piston component 28 moving along with it. The advantageous movability of first primary piston component 22 may be (practically) independent of a position of second primary piston component 28. Similarly, second primary piston component 28 may also be movable without first primary piston component 22 moving along with it, and/or (practically) independently of a position of first primary piston component 22.

In one preferred specific embodiment, first piston element 24 has a continuous recess 36 within which second piston element 30 is situated so as to be at least partially movable. First piston element 24 may have a ring-shaped design, for example. Due to the external design of first piston element 24, at least one hydraulic connection/balancing bore 38, which connects first pressure chamber 10 to a brake fluid reservoir (not illustrated), may be easily sealed off with respect to second piston element 30 by moving first piston element 24 with the aid of driver braking force Fb. Thus, despite a failure of brake booster actuator device 26, the at least one hydraulic connection/balancing bore 38 between first pressure chamber 10 and the brake fluid reservoir may be sealed off with the aid of driver braking force Fb, and the first brake pressure may be built up in the pressure chamber volume. In a design of master brake cylinder 12 as a tandem master brake cylinder, floating piston 16 may also be moved via the built-up first brake pressure in such a way that at least one hydraulic connection/balancing bore 40 between second pressure chamber 14 and the brake fluid reservoir is sealed off and a second brake pressure is built up in second pressure chamber 14. Thus, despite the functional failure of brake booster actuator device 26, the driver still has the option to reliably brake the at least one brake circuit 20a and 20b of the braking system of a vehicle with the aid of driver braking force Fb.

First piston element 24 may thus also be described as an outer piston/outer ring piston. Similarly, second piston element 30 may be described as an inner piston situated in first piston element 24. At least one sealing element 25, for example a sealing ring or a lip seal, may be situated between the two piston elements 24 and 30 to prevent liquid from seeping through between the two piston elements 24 and 30. Similarly, liquid may be prevented from seeping out from master brake cylinder 12 between second piston element 30 and an inner wall of master brake cylinder 12 by using at least one sealing element 31, which likewise may be a sealing ring or a lip seal. In addition, undesirable liquid exchange between the two pressure chambers 10 and 14 may be intermittently prevented via a sealing element 33 on floating piston 16.

In one preferred specific embodiment, a first end section 42 of first primary piston component 22 facing away from first piston element 24 protrudes into an interior space that is spanned by at least one second end section 44 of second primary piston component 28 facing away from second piston element 30. This may also be described in such a way that first primary piston component 22 has a first extension a1 on first end section 42, perpendicular to a direction of movement 46 of first primary piston component 22 and/or of second primary piston component 28, which is smaller than a second extension a2 of second primary piston component 28 on second end section 24 perpendicular to direction of movement 46. As described in greater detail below, inexpensive and easily producible brake booster elements may be ensured due to the advantageous design of primary piston components 22 and 28 and their cooperation described here.

Figure 5:
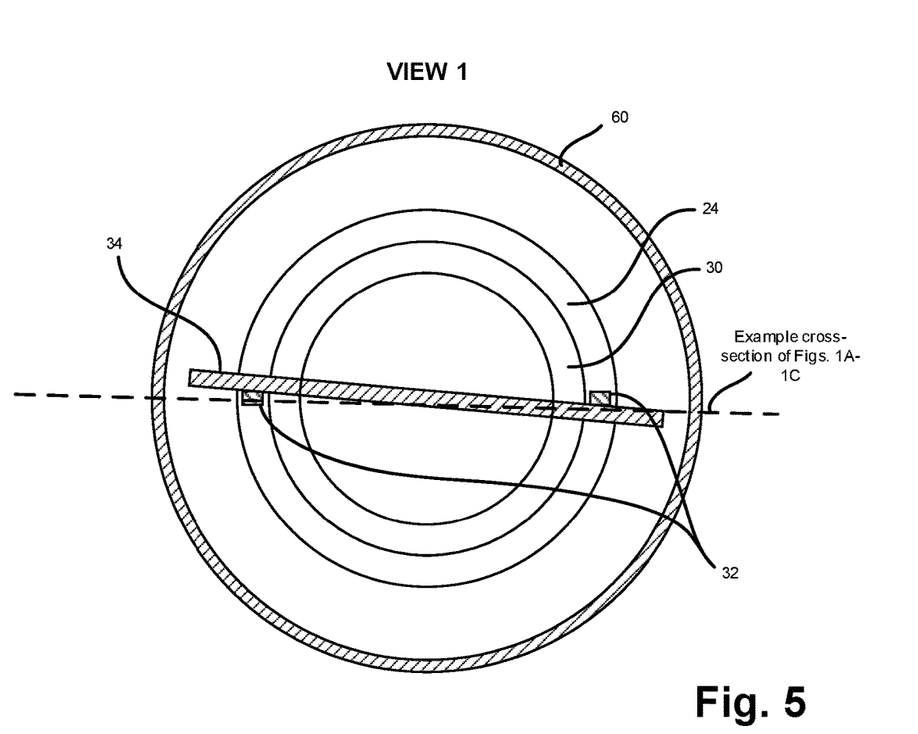
FIG. 5 illustrates a cross-section corresponding to VIEW 1 marked in FIG. 1A, according to an example embodiment of the present invention.
Figure 6:
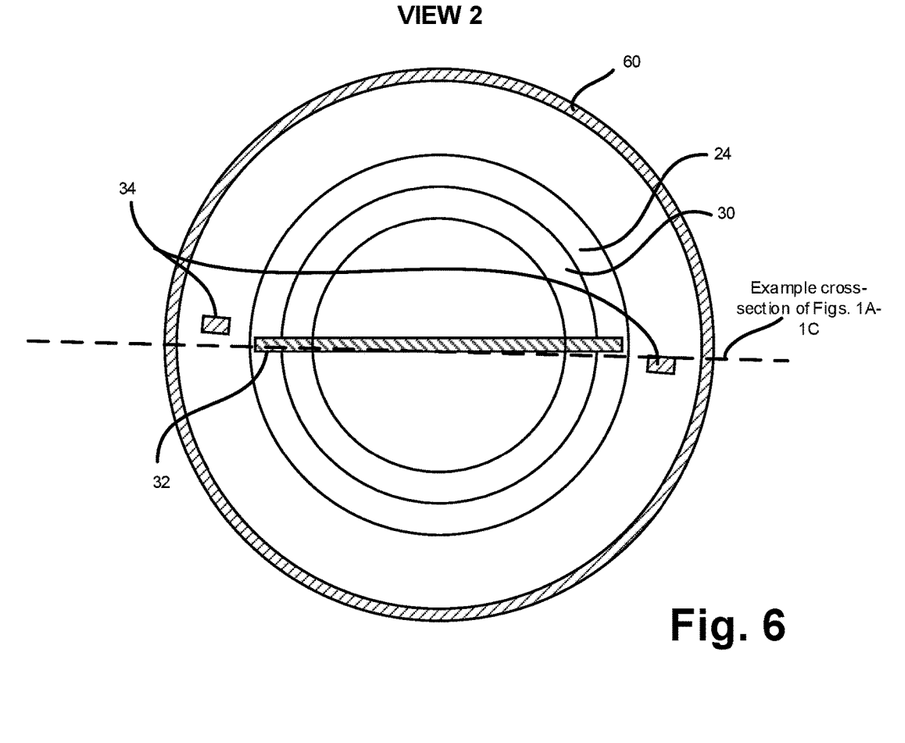
FIG. 6 illustrates a cross-section corresponding to VIEW 2 marked in FIG. 1A, according to an example embodiment of the present invention.
Figure 7:
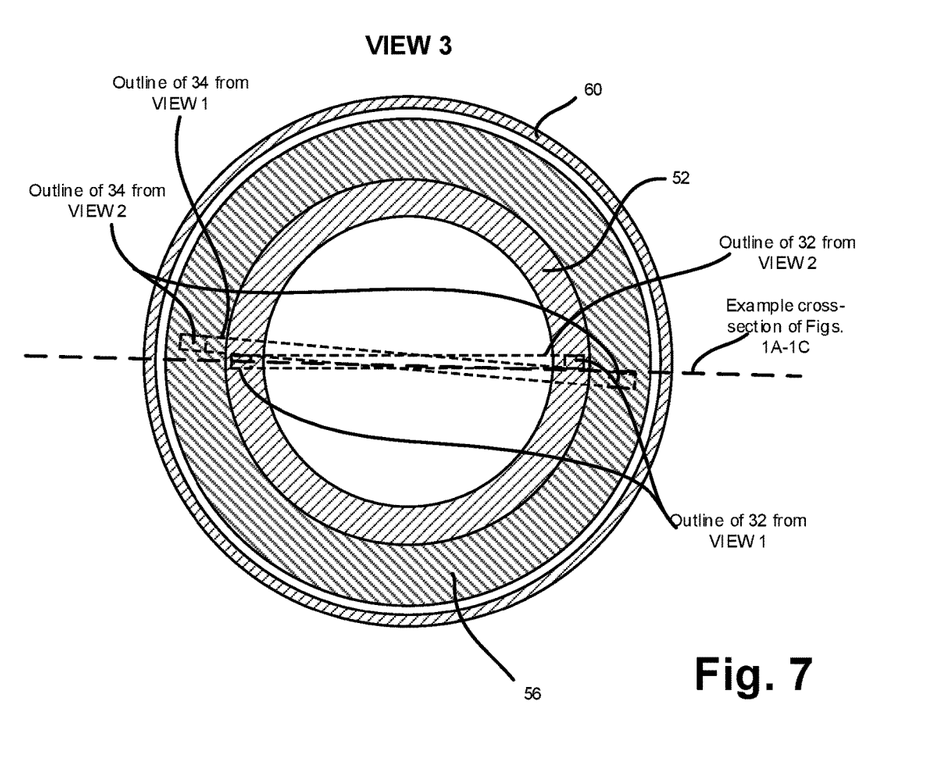
FIG. 7 illustrates a cross-section corresponding to VIEW 3 marked in FIG. 1A, according to an example embodiment of the present invention.
Figure 8:
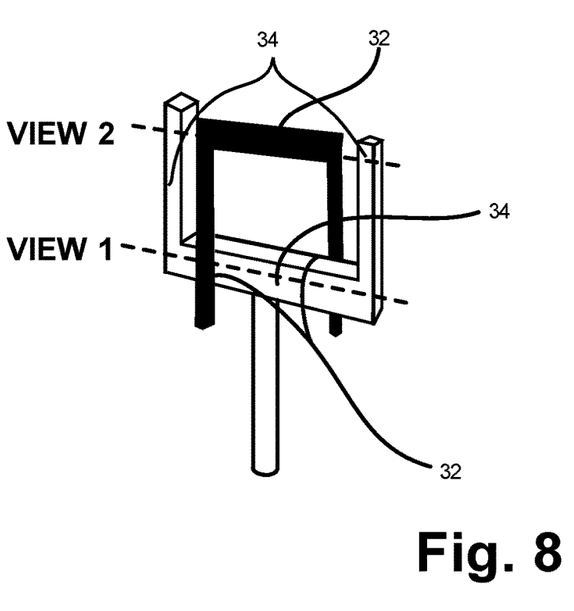
FIG. 8 is a schematic perspective view of a fork configuration of force couplings according to an example embodiment of the present invention.

For example, force couplings 32 and 34 can be provided with a fork configuration, where first force coupling 32 protrudes into the spanned interior space of second force coupling 34, as shown in FIG. 1A. This results, for example, in cross-sections like those shown in FIGS. 5-7, which are perpendicular to the cross-section of FIG. 1A and correspond to VIEWS 1-3 marked in FIG. 1A. An example perspective view of a schematic representation of the fork configuration is shown in FIG. 8, which has been marked with indications of correspondence of the representation to VIEWS 1 and 2 of FIGS. 5 and 6. (It is noted that the perspective view is in exaggerated form and only intended for describing an example of an interweaving of parts of a fork configuration.) Specifically, for example, at the part of FIG. 1A, corresponding to VIEW 1, a first part of force coupling 34 is in front of a first part of force coupling 32 and therefore the first part of force coupling 34 appears in the cross-section of FIG. 1A, while the first part of force coupling 32 does not appear in the cross-section of FIG. 1A, and a second part of force coupling 34 is behind a second part of force coupling 32 and therefore the second part of force coupling 34 does not appear in the cross-section of FIG. 1A, while the second part of force coupling 32 does appear in the cross-section of FIG. 1A. In this regard, a broken line corresponding to the cross section of FIG. 1A is drawn in VIEWS 1 and 2 of FIGS. 5 and 6. It can be seen that, at the right side of VIEWS 1 and 2, the broken line cuts through force coupling 34 and does not cut through force coupling 32, while, at the left side of VIEWS 1 and 2, the broken line cuts through force coupling 32 and does not cut through force coupling 34.

In the braking system schematically depicted in FIGS. 1A through 1C, the primary piston assembly cooperates with elements of a brake booster 48. It is pointed out that the design of the cooperating elements of brake booster 48 is not limited to the design of brake booster 48 described below:

Brake booster 48 has an at least partially elastic force transmission component composed, for example, of a reaction disk 50 and a reaction disk guide 52. Driver braking force Fb exerted on a brake actuating element situated in the braking system is transmittable to reaction disk 50 via at least one input rod 54. However, as described in greater detail below, a distance unequal to zero may also be intermittently present between input rod 54 and reaction disk 50, thus preventing a transmission of driver braking force Fb to reaction disk 50.

The brake actuating element may be a brake pedal, for example. However, the design of the brake actuating element is not limited to a brake pedal. First primary piston component 22 contacts reaction disk 50 in such a way that the first force transmission contact is present and driver braking force Fb is transmittable to first primary piston component 22.

In addition, brake booster 48 includes a booster member 56 which is movable with the aid of brake booster actuator device 26. Second primary piston component 28 contacts booster member 56 in such a way that the second force transmission contact is present and first braking assisting force Fu1 is transmittable to second primary piston component 28.

Optionally, booster member 56 may also contact the at least partially elastic force transmission component, which includes reaction disk 50 and reaction disk guide 52, for example. A presence of the third force transmission contact may be established in this way, as the result of which second braking assisting force Fu2 is transmittable to first primary piston component 22.

The first force transmission contact, the second force transmission contact, and/or the third force transmission contact may thus be understood to mean a direct contact or an indirect contact. The first force transmission contact may thus also be present although first primary piston component 22 does not directly contact the brake actuating element. Likewise, the second force transmission contact between brake booster actuator device 26 and second primary piston component 28 may be established via at least one force transmission element, for example booster member 56. Similarly, the third force transmission contact is also achievable without a direct contact between first primary piston component 22 and brake booster actuator device 26.

In brake booster 48 of the illustrated specific embodiment, booster member 56 has a continuous opening 58 within which input rod 54 and/or the at least partially elastic force transmission component (composed of reaction disk 50 and reaction disk guide 52, for example) is/are situated so as to be movable with respect to booster member 56. Due to the above-described advantageous design of first force coupling 32 and of second force coupling 34, forces Fb, Fu1, and Fu2 may be reliably transmitted from the elements of brake booster 48 to their associated piston elements 24 and 30 despite the guiding of input rod 56 and/or the at least partially elastic force transmission component within continuous opening 58.

Inexpensive components of conventional brake boosters may thus be used for implementing brake booster 48. However, it is pointed out once again that the design of brake booster 48 is not limited to the above designs.

FIG. 1A depicts the braking system, equipped with the primary piston assembly, in its starting position with a driver braking force Fb equal to zero. (The driver does not actuate the brake actuating element in the situation depicted in FIG. 1A.) Similarly, assisting forces Fu1 and Fu2 are also equal to zero. Piston elements 24 and 30 and booster member 56 are therefore in their starting positions. First piston travel k1 of first piston element 24, second piston travel k2 of second piston element 30, and displacement travel sv of booster member 56 are equal to zero. In addition, an air gap 64/free travel is present between reaction disk 50 and input rod 54.

In contrast, FIGS. 1B and 1C show the braking system during an actuation of the brake actuating element by the driver, with a driver braking force Fb unequal to zero.

FIG. 1B depicts the braking system when brake booster actuator device 26 is in its functionally active state. In this case, a sum of assisting forces Fu1 and Fu2 unequal to zero is exertable on booster member 56 with the aid of brake booster actuator device 26. (A control of brake booster actuator device 26 is preferably designed to set the sum of assisting forces Fu1 and Fu2 to be exerted on booster member 56 unequal to zero, taking driver braking force Fb into account.)

Booster member 56 is movable by a displacement travel sv, unequal to zero, against the restoring force of a restoring spring 62 situated in housing 60 with the aid of the sum of assisting forces Fu1 and Fu2. The braking of first pressure chamber 10 may thus be started with the aid of the sum of assisting forces Fu1 and Fu2, even though air gap 64/free travel between reaction disk 50 and input rod 54 is still at least partially present. For this purpose, first piston element 24 is moved by a first piston travel k1, unequal to zero, with the aid of first assisting force Fu1 in such a way that the at least one balancing bore 38 between first pressure chamber 10 and the brake fluid reservoir is sealed off, and first braking surface F1 is displaced for reducing the pressure chamber volume. In addition, second piston element 30 may be moved by a second piston travel k2, unequal to zero, into first pressure chamber 10 with the aid of second assisting force Fu2.

FIG. 1C depicts the advantageous mode of operation of the primary piston assembly despite a failure of brake booster actuator device 26. Although no assisting force Fu1 and Fu2 is exertable on booster member 56 with the aid of brake booster actuator device 26, and the booster member is in its starting position (sv equal to zero), air gap 64 between reaction disk 50 and input rod 54 may be closed with the aid of driver braking force Fb, unequal to zero. Due to the first force transmission contact between input rod 54 and first primary piston component 22 which is thus achieved, first piston element 24 may be moved by a first piston travel k1, unequal to zero, despite second piston element 30 being in its starting position (and with a second piston travel k2 equal to zero). The driver thus has the option to easily brake master brake cylinder 12 despite the functional impairment of brake booster actuator device 26.

In the fall-back level (automatically mechanically) triggered by a failure/a functional impairment of brake booster actuator device 26, the driver actuates only first piston element 24. In the (mechanical) fall-back level, a braking surface reduction of the sum of first braking surface F1 and second braking surface F2 on first braking surface F1 is thus achieved. Due to the (automatically) effected braking surface reduction, the driver attains a higher brake pressure at same driver braking force Fb.

First braking surface F1 may be equal to second braking surface F2. In this case, in the event of a failure/a functional impairment of brake booster actuator device 26, this results in a reduction of the braking surface to one-half the sum of the two braking surfaces F1 and F2. Driver braking force Fb to be applied by the driver during back-up braking (in the mechanical fall-back level) is thus also reduced by half. In this way a vehicle deceleration of 0.64 g may be reliably achieved with the aid of a driver braking force of 500 N. The lengthening of the braking distance which may possibly be associated with the reduction of driver braking force Fb to be applied is seldom considered as a drawback by most drivers. During back-up braking, drivers generally prefer a lengthening of the braking distance over an increase in braking force.

During back-up braking using the specific embodiment described here, hydraulic connection/balancing bore 38 between first pressure chamber 10 and the brake fluid reservoir may also be reliably sealed off by moving first piston element 24 with the aid of driver braking force Fb. This is achievable although second piston element 30 remains in its starting position. Due to the less complicated implementation of the separation of first pressure chamber 10 from the brake fluid reservoir which may be carried out with driver braking force Fb, an additional mechanism for sealing off hydraulic connection/balancing bore 38 after the failure/the functional impairment of brake booster actuator device 26 is recognized may be saved. A cost-effective reservoir connection/balancing bore 38 is thus usable in the primary piston assembly described here, despite the subdivision/separation of the primary piston.

Figure 2:
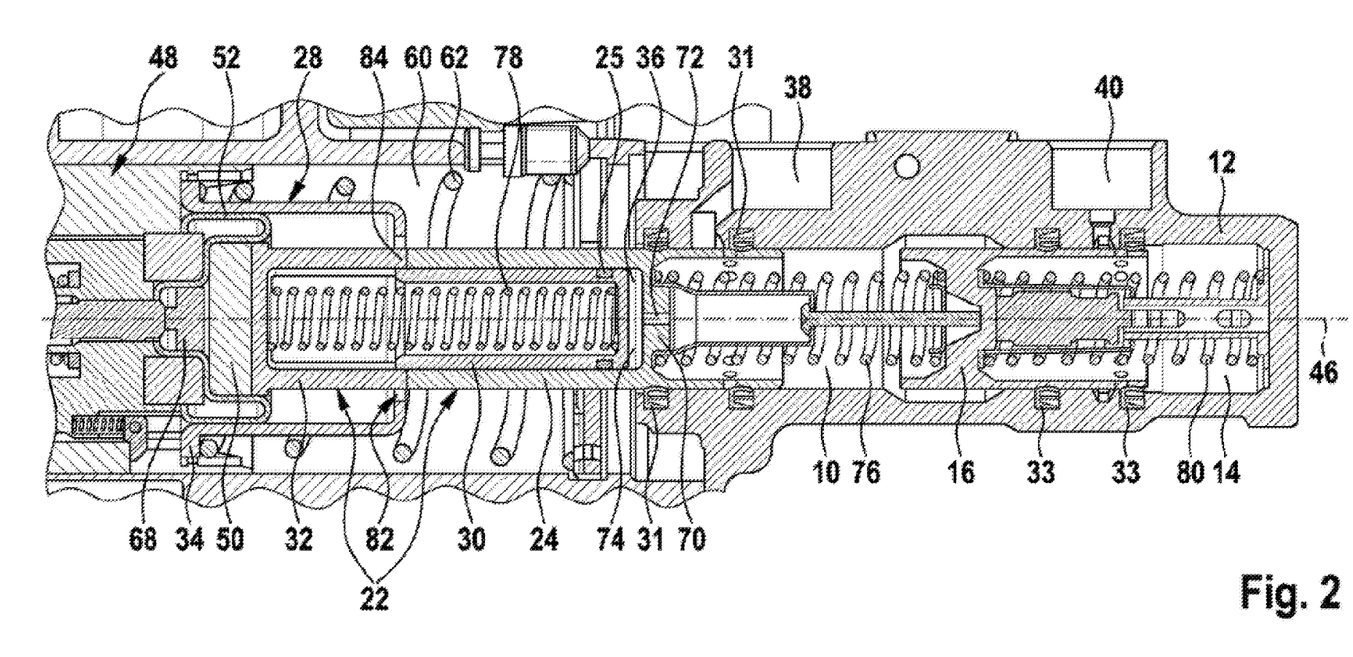
FIG. 2 shows a schematic illustration of a second specific embodiment of the primary piston assembly.

FIG. 2 shows a schematic illustration of a second specific embodiment of the primary piston assembly.

The primary piston assembly schematically depicted in FIG. 2 has the components described above. In contrast to the specific embodiment described above, second primary piston component 28 has a one-piece design in the primary piston assembly in FIG. 2. Likewise, an end of input rod 54 facing reaction disk 50 has the design of a tablet 68.

In addition, a (perforated) inner wall 70 having at least one flowthrough opening 72 is formed in continuous recess 36. Second piston element 30 is situated on a side of inner wall 70 facing away from the center of master brake cylinder 12. The at least one flowthrough opening 72 has an inner diameter that is too small for second piston element 30 to move into. However, the at least one flowthrough opening 72 ensures a liquid exchange between first pressure chamber 10 and an internal volume 74 between (perforated) inner wall 70 and second braking surface F2.

(Perforated) inner wall 70 forms a sufficient contacting surface for a first pressure chamber spring 76 situated in first pressure chamber 10. Via a primary piston spring 78, it may also be ensured that the volume of internal volume 74 corresponds to the brake pressure that is present in first pressure chamber 10. For this purpose, primary piston spring 78 may be supported on a first end at an inner surface of a section of second primary piston component 28 protruding into master brake cylinder 12, and/or on a second end at an inner surface of a section of first primary piston component 22 facing away from master brake cylinder 12. A second pressure chamber spring 80 may be situated in second pressure chamber 14.

A recess 82 may be formed in second primary piston component 28, adjacent to a fork/further extension perpendicular to direction of movement 46, through which an intermediate section 84 of first primary piston component 22 protrudes. The advantageous movability of the two primary piston components 22 and 28 independently of one another may be reliably ensured in this way.

The primary piston assemblies described in the above paragraphs may be easily designed in such a way that a vehicle deceleration of at least 3 m/s$^2$ is achievable with the aid of a driver braking force Fb of 500 N, even without boosting by brake booster 46. In particular, with the aid of the primary piston assemblies, a vehicle deceleration of even 6.45 m/s$^2$ may be achievable with the aid of a driver braking force of 500 N, even in the event of a failure of brake booster actuator device 26. Since the driver himself may easily apply a driver braking force of 500 N, braking of master brake cylinder 12 may still be easily carried out, even in the event of a failure of the brake booster.

To maintain a conventional braking feel, the mechanical boosting factor, i.e., the area ratio of reaction disk 50 to first force coupling 32, may be re-established.

Figure 3:
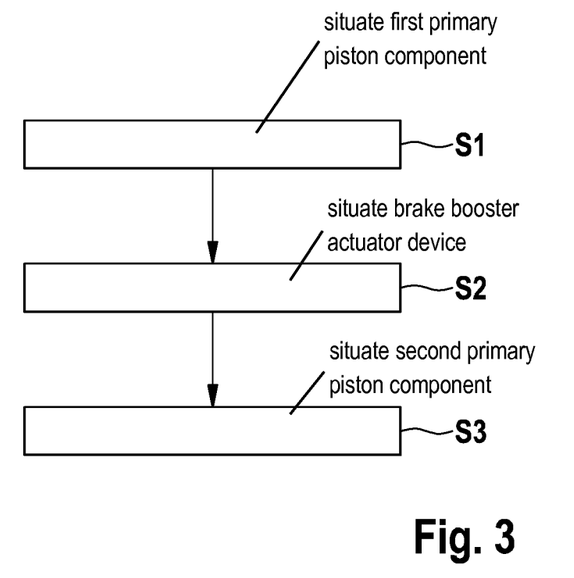
FIG. 3 shows a flow chart for illustrating one specific embodiment of the manufacturing method.

FIG. 3 shows a flow chart for illustrating one specific embodiment of the manufacturing method.

A braking unit having at least one master brake cylinder and one brake booster is manufacturable with the aid of the manufacturing method described below. In particular, the above-described exemplary embodiments are manufacturable with the aid of the manufacturing method. However, the use of the manufacturing method is not limited to the manufacture of these exemplary embodiments.

A first primary piston component is situated with respect to an input rod in a method step S1 in such a way that a driver braking force transmitted to the input rod during operation of the braking unit is transmitted to the first primary piston component, and a pressure chamber volume of a pressure chamber of the master brake cylinder which is fillable with liquid is reduced by moving a first piston element of the first primary piston component with the aid of the driver braking force.

A brake booster actuator device is situated in the braking unit in a method step S2. As stated above, an inexpensive hydraulic or electromechanical actuator may also be used for the brake booster actuator device. Even further components of a brake booster may be provided in addition to the brake booster actuator device.

A second primary piston component is situated with respect to the brake booster actuator device in a method step S3 in such a way that during operation of the braking unit, a braking assisting force provided by the brake booster actuator device is transmitted to the second primary piston component, and the pressure chamber volume which is fillable with liquid is reduced by moving a second piston element of the second primary piston component with the aid of the braking assisting force.

The numbering of above-described method steps S1 through S3 does not specify a chronological sequence for carrying out the manufacturing method.

In one particularly advantageous specific embodiment of method steps S1 through S3, the first primary piston component includes a tubular first piston element which has a (continuous) recess. The second primary piston component may have a second piston element that is situated so as to be movable within the recess (practically) independently of a position of the first primary piston component. In this case, the pressure chamber volume of the pressure chamber of the master brake cylinder which is fillable with liquid is delimited by a first surface area of the first piston element and by a second surface area of the second piston element. In addition to the arrangement of the two piston elements with respect to one another described here, a first end section of the first primary piston component facing away from the first piston element and a second end section of the second primary piston component facing away from the second piston element may be situated with respect to one another in such a way that the first end section protrudes into an interior space spanned by the second end section. Reference is made to the preceding descriptions with regard to further advantageous design and arrangement possibilities for the two primary piston components.

Optionally, in the manufacturing method at least a portion of the input rod and an at least partially elastic force transmission component that is at least intermittently contacted by the input rod may be situated within a continuous opening in a booster member, and a first force coupling of the first primary piston component from the first piston element to the at least partially elastic force transmission component may be designed in such a way that during operation of the braking unit, the driver braking force is transmitted from the input rod to the first piston element via the at least partially elastic force transmission component and the first force coupling. Likewise, the brake booster actuator device may be situated at the booster member, and a second force coupling of the second primary piston component from the second piston element to the booster member may be designed in such a way that during operation of the braking unit, the braking assisting force is transmitted via the second force coupling to the second piston element, situated in a continuous recess in the first piston element, by moving the booster member with the aid of the brake booster actuator device.

In addition, at least one brake circuit may be provided in the braking unit in a manufacturing method for a braking system of a vehicle.

Figure 4:
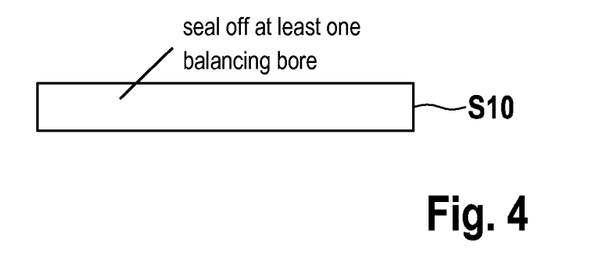
FIG. 4 shows a flow chart for illustrating one specific embodiment of the method for operating a braking unit.

FIG. 4 shows a flow chart for illustrating one specific embodiment of the method for operating a braking unit.

The method schematically depicted in FIG. 4 may be carried out, for example, with the aid of the above-described primary piston assemblies or with the braking systems thus equipped. However, the practicability of the method is not limited to the specific embodiments depicted above.

The method has a method step S10 in which at least one balancing bore of a master brake cylinder of the braking unit is sealed off by transmitting a driver braking force to a first piston element in such a way that the at least one balancing bore is covered with the aid of the moved first piston element, and a pressure chamber volume of a pressure chamber of the master brake cylinder which is fillable with liquid is reduced. During this method step S10, even a partial transmission of the driver braking force to a second piston element, with the aid of which the pressure chamber volume of the pressure chamber which is fillable with liquid is reducible, is prevented.

The method ensures the advantages described above. Therefore, these advantages are not described again here.

What is claimed is:

1. A primary piston assembly for a master brake cylinder of a vehicle braking system of a vehicle, the master brake cylinder being fillable with liquid, the primary piston assembly comprising:
   a first primary piston component that includes a first piston element to which is transmittable a driver braking force generated by at least one brake actuating element situated in the braking system, to thereby move the first piston element in a manner that the first piston element reduces a pressure chamber volume of a pressure chamber of the master brake cylinder; and
   a second primary piston component that includes a second piston element that is movable under a force towards the pressure chamber in a manner that the second piston element reduces the pressure chamber volume of the pressure chamber;
   wherein:
     the first primary piston component and the second primary piston component are arranged relative to each other such that:
       when the second piston element is moved in the manner that the second piston element reduces the chamber volume of the pressure chamber, the first piston element is also movable in the manner that the first piston element reduces the chamber volume of the pressure chamber; and
       when the driver braking force is transmitted to the first piston element, the first piston element is movable in the manner that the first piston element reduces the chamber volume of the pressure chamber without applying any force to the second piston element in a direction towards the pressure chamber and without effecting any movement of the second piston element in the manner that the second piston element reduces the chamber volume of the pressure chamber; and
     at least one of:
       a portion of the second primary piston component that is nearest to the chamber is housed within an interior of a portion of the first primary piston component that is nearest to the chamber; and
       the second primary piston component includes a booster rod and is arranged relative to the first primary piston component such that the booster rod is configured to move the first primary piston component in the manner that the first primary piston component reduces the pressure chamber volume of the pressure chamber of the master brake cylinder when the second primary piston component is moved under the force towards the pressure chamber in the manner that the second primary piston component reduces the pressure chamber volume of the pressure chamber of the master brake cylinder.

2. The primary piston assembly as recited in claim 1, wherein the first piston element has a continuous recess within which the second piston element is situated so as to be at least partially movable.

3. The primary piston assembly as recited in claim 2, wherein the first piston element has a ring-shaped design.

4. The primary piston assembly as recited in claim 2, wherein at least one balancing bore of the master brake cylinder may be sealed off by the driver braking force moving the first piston element.

5. The primary piston assembly as recited in claim 2, wherein a part of the first primary piston component is radially interior to a part of the second primary piston component.

6. The primary piston assembly as recited in claim 1, wherein a first face of the first piston element is a first movable wall of the pressure chamber at a first side of the pressure chamber, a first face of the second piston element is a second movable wall of the pressure chamber at the first side of the pressure chamber, the second movable wall is radially interior of the first movable wall, such that the first movable wall is movable away from the second movable wall under influence of the driver braking force to gradually increase a difference in a size of the pressure chamber at a radially exterior section thereof relative to a radially interior region thereof.

7. The primary piston assembly as recited in claim 1, wherein an end section of the first primary piston component facing away from the pressure chamber protrudes into an interior space of an end section of the second primary piston component facing away from the pressure chamber.

8. The primary piston assembly as recited in claim 1, wherein the second primary piston component includes the booster rod and is arranged relative to the first primary piston component such that the booster rod is configured to move the first primary piston component in the manner that the first primary piston component reduces the pressure chamber volume of the pressure chamber of the master brake cylinder when the second primary piston component is moved under the force towards the pressure chamber in the manner that the second primary piston component reduces the pressure chamber volume of the pressure chamber of the master brake cylinder.

9. The primary piston assembly as recited in claim 1, wherein the first and second primary piston components are arranged so that, in absence of the forces, an end face of the first piston element facing the pressure chamber and an end face of the second piston element facing the pressure chamber are aligned at a same axial position with respect to a central longitudinal axis of the primary piston assembly.

10. The primary piston assembly as recited in claim 1, wherein an end face of the second primary piston component that faces the chamber forms a first portion of a boundary wall of the chamber and an end face of the first primary piston component that faces the chamber forms a second portion of the boundary wall of the chamber.

11. The primary piston assembly as recited in claim 10, wherein the end face of the second primary piston component that faces the chamber and forms the first portion of a boundary wall of the chamber occupies radial coordinates, relative to a central longitudinal axis of the chamber, that is interior of radial coordinates occupied by the end face of the first primary piston component that faces the chamber and forms the second portion of the boundary wall of the chamber.

12. The primary piston assembly as recited in claim 1, wherein the portion of the second primary piston component that is nearest to the chamber is housed within the interior of the portion of the first primary piston component that is nearest to the chamber.

13. A braking unit for a braking system of a vehicle, comprising:
   an input rod;
   a master brake cylinder that is fillable with liquid; and
   a primary piston assembly that includes:
      a first primary piston component that includes a first piston element to which is transmittable a driver braking force generated by the input rod, to thereby move the first piston element in a manner that the first piston element reduces a pressure chamber volume of a pressure chamber of the master brake cylinder; and
      a second primary piston component that includes a second piston element that is movable under a force towards the pressure chamber in a manner that the second piston element reduces the pressure chamber volume of the pressure chamber;
   wherein:
      the first primary piston component and the second primary piston component are arranged relative to each other such that:
         when the second piston element is moved in the manner that the second piston element reduces the chamber volume of the pressure chamber, the first piston element is also movable in the manner that the first piston element reduces the chamber volume of the pressure chamber; and
         when the driver braking force is transmitted to the first piston element, the first piston element is movable in the manner that the first piston element reduces the chamber volume of the pressure chamber without applying any force to the second piston element in a direction towards the pressure chamber and without effecting any movement of the second piston element in the manner that the second piston element reduces the chamber volume of the pressure chamber; and
      at least one of:
         an end face of the second primary piston component that faces the chamber forms a first portion of a boundary wall of the chamber and an end face of the first primary piston component that faces the chamber forms a second portion of the boundary wall of the chamber;
         a portion of the second primary piston component that is nearest to the chamber is housed within an interior of a portion of the first primary piston component that is nearest to the chamber; and
         (i) the braking unit further comprises a booster rod and an at least partially elastic force transmission component, (ii) the input rod is arranged to transmit the driver braking force to the at least partially elastic force transmission component, (iii) the first primary piston component contacts the at least partially elastic force transmission component in such a way that the driver braking force is transmittable to the first primary piston component, and (iv) the booster rod (a) contacts the second primary piston component to apply to the second primary piston component the force towards the pressure chamber by movement of the booster rod, and (b) contacts the at least partially elastic force transmission component to apply to the first primary piston component the force towards the pressure chamber by movement of the booster rod.

14. The braking unit as recited in claim 13, wherein:
the braking unit further comprises the booster rod and the at least partially elastic force transmission component;
the input rod is arranged to transmit the driver braking force to the at least partially elastic force transmission component;
the first primary piston component contacts the at least partially elastic force transmission component in the way that the driver braking force is transmittable to the first primary piston component; and
the booster rod contacts the second primary piston component to apply to the second primary piston component the force towards the pressure chamber by movement of the booster rod.

15. The braking unit as recited in claim 14, wherein the booster rod contacts the at least partially elastic force transmission component to apply to the first primary piston component the force towards the pressure chamber by movement of the booster rod.

16. The braking unit as recited in claim 14, wherein the booster rod has a continuous opening, and at least one of the input rod and the at least partially elastic force transmission component is at least partially guided within the continuous opening.

17. The braking unit as recited in claim 13, wherein the input rod, the first primary piston component, and the second primary piston component are arranged relative to each other such that the driver braking force is transmittable by the input rod to the first primary piston component:
   (a) by translation of the input rod within a part of the second primary piston component for application of the driver braking force to a surface of the first primary piston component, at least a part of which surface is radially in line with the input rod; and
   (b) without any of the driver braking force being transmitted to the second primary piston component.

18. A braking system for a vehicle, comprising:
at least one brake circuit; and
a braking unit including:
   an input rod;
   a master brake cylinder that is fillable with liquid; and
   a primary piston assembly, the primary piston assembly including:
      a first primary piston component that includes a first piston element to which is transmittable a driver braking force generated by the input rod, to thereby move the first piston element in a manner that the first piston element reduces a pressure chamber volume of a pressure chamber of the master brake cylinder; and
      a second primary piston component that includes a second piston element that is movable under a force towards the pressure chamber in a manner that the second piston element reduces the pressure chamber volume of the pressure chamber;
wherein:
   the first primary piston component and the second primary piston component are arranged relative to each other such that:
      when the second piston element is moved in the manner that the second piston element reduces the chamber volume of the pressure chamber, the first piston element is also movable in the manner that the first piston element reduces the chamber volume of the pressure chamber; and
      when the driver braking force is transmitted to the first piston element, the first piston element is movable in the manner that the first piston element reduces the chamber volume of the pressure chamber without applying any force to the second piston element in a direction towards the pressure chamber and without effecting any movement of the second piston element in the manner that the second piston element reduces the chamber volume of the pressure chamber; and
   at least one of:
      an end face of the second primary piston component that faces the chamber forms a first portion of a boundary wall of the chamber and an end face of the first primary piston component that faces the chamber forms a second portion of the boundary wall of the chamber;
      a portion of the second primary piston component that is nearest to the chamber is housed within an interior of a portion of the first primary piston component that is nearest to the chamber; and
      the second primary piston component includes a booster rod and is arranged relative to the first primary piston component such that the booster rod is configured to move the first primary piston component in the manner that the first primary piston component reduces the pressure chamber volume of the pressure chamber of the master brake cylinder when the second primary piston component is moved under the force towards the pressure chamber in the manner that the second primary piston component reduces the pressure chamber volume of the pressure chamber of the master brake cylinder.

* * * * *